United States Patent [19]
van Bashuysen

[11] 4,335,849
[45] Jun. 22, 1982

[54] MOTOR VEHICLE HAVING A PASSENGER COMPARTMENT HEATING DEVICE

[75] Inventor: Richard van Bashuysen, Biberach, Fed. Rep. of Germany

[73] Assignee: Audi Nsu Auto Union Aktiengesellschaft, Fed. Rep. of Germany

[21] Appl. No.: 181,618

[22] Filed: Aug. 26, 1980

[30] Foreign Application Priority Data

Sep. 14, 1979 [DE] Fed. Rep. of Germany ....... 2937165

[51] Int. Cl.³ .............................................. B60H 1/00
[52] U.S. Cl. .............................. 237/12.3 B; 123/323; 123/142.5 R
[58] Field of Search .................... 237/12.3 B, 12.3 C, 237/12.3 R; 123/323, 142.5 R

[56] References Cited

U.S. PATENT DOCUMENTS

| | | | |
|---|---|---|---|
| 1,740,790 | 12/1929 | Stanton | 123/323 |
| 1,829,780 | 11/1931 | Beytes et al. | 123/323 |
| 3,236,044 | 2/1966 | Ruge | 237/12.3 C |
| 3,236,453 | 2/1966 | Raymond | 237/12.3 C |
| 3,523,418 | 8/1970 | Marsee | 123/323 |
| 4,079,715 | 3/1978 | Masaki et al. | 123/142.5 R |

*Primary Examiner*—Ronald C. Capossela
*Attorney, Agent, or Firm*—Kane, Dalsimer, Kane, Sullivan and Kurucz

[57] ABSTRACT

This invention relates to motor vehicles having passenger compartment heating devices. The temperature of the cooling water of an engine may be increased at idling speeds and low speed states by throttling the engine exhaust to increase fuel consumption. A throttle device is controlled in accordance with cooling water temperature and passenger compartment temperature, in response to activation by manual control. Manual control is overridden by an accelerator pedal actuated control when the load of the engine rises. Heat is extracted from the engine cooling water by means of a heat exchanger, through which air is driven into the passenger compartment. A brake is connected to an independently actuated device to throttle the exhaust to brake the engine. This arrangement is particularly suitable for use with diesel engines.

11 Claims, 2 Drawing Figures

MOTOR VEHICLE HAVING A PASSENGER COMPARTMENT HEATING DEVICE

BACKGROUND OF THE INVENTION

This invention relates to a motor vehicle with a heating device for the passenger compartment, which device has a heat exchanger for exchanging heat between the engine cooling water and heating medium and to such heating devices. Known heating devices generally operate satisfactorily as long as an adequate quantity of heat is delivered to the cooling water of the engine. However, particularly in the case of high efficiency diesel engines, the quantity of heat supplied during idling and in the lower part of the load range is not sufficient to ensure adequate heating for the passenger compartment when the outside temperature is around or below freezing point. Auxiliary heat exchangers or auxiliary heating methods are independent of the engine are costly.

A device is known for heating a driver's cab, in which the heat exchanger for the heating medium is in communication with a second heat exchanger which is itself connected through a bypass line to the exhaust pipe, a control device being provided in the exhaust pipe with which the exhaust pipe can be closed, so that the exhaust gas can be passed through the second heat exchanger. The counter pressure created by the second heat exchanger loads the engine in such a way that the idling speed can be maintained only by increasing the quantity of fuel supplied to the engine. This occurs automatically in standard diesel fuel injection pumps. The combustion of extra fuel results in a corresponding increase in cooling water temperature and exhaust gas temperature. However, the provision of the second heat exchanger which is necessary for heating device and which is supposed to act as an evaporator, increases the costs of the heating device quite considerably.

The object of the injection is to provide a heating device having an adequate heat output at idling speeds and which is inexpensive.

The present invention consists in a motor vehicle, having a water-cooled engine and a heating device for the passenger compartment, which includes a heat exchanger for the heating medium connected in the cooling water circuit of the engine and a throttle element which is disposed in the exhaust of the engine which can be actuated, in a sense to restrict the exhaust manually and/or in dependence upon the outside temperature, the compartment temperature or the cooling water temperature, and which can be actuated in an opening direction in accordance with the engine load.

If the throttle element is closed manually or by a compartment thermostat or a cooling water thermostat, an increased quantity of fuel is distributed by the regulator of the diesel fuel injection pump in order to maintain the idling speed. The quantity of heat passing into the cooling water during the combustion of this extra fuel ensures adequate heating of the passenger compartment, rapid heating of the engine associated with better noise behavior in the warm running phase of the engine and low cold water.

In one embodiment of the engine, the following values have been measured for idling:
Free throttle cross-section 1.4%
Consumption 190% of idling consumption with exhaust throttling
Water heat 327% of the heat fed to the cooling water without any exhaust throttling
Free throttle cross-section 0.9%:
Consumption 224%
Water heat 434%

The exhaust throttling is usually necessary only during idling and in the lower part of the load range, up to 50 km/h, and it must naturally be removed when high power is required. The throttle element is therefore preferably connected to a device which indicates the load state of the engine, for example, to the accelerator pedal or the regulating element of the fuel injection pump, in such a way that the throttle is fully opened regardless of any manual and/or thermostatic adjustment. The engine can therefore operate normally and with the lowest possible fuel consumption when a certain predetermined load is exceeded.

Additionally the throttle element can be actuatable by a brake actuator in the closing direction independently of the manual, thermostatic and/or load-dependent actuation. A controllable exhaust braking action is thereby obtained with the possibility of reducing the normal service brake. Furthermore, cooling of the engine during coasting is prevented.

BRIEF DESCRIPTION OF THE DRAWINGS

The invention may be performed in a number of ways a specific embodiment of which will now be described with reference to the accompanying drawings in which.

DETAILED DESCRIPTION OF THE PREFERRED EMBODIMENT

Figure 1:
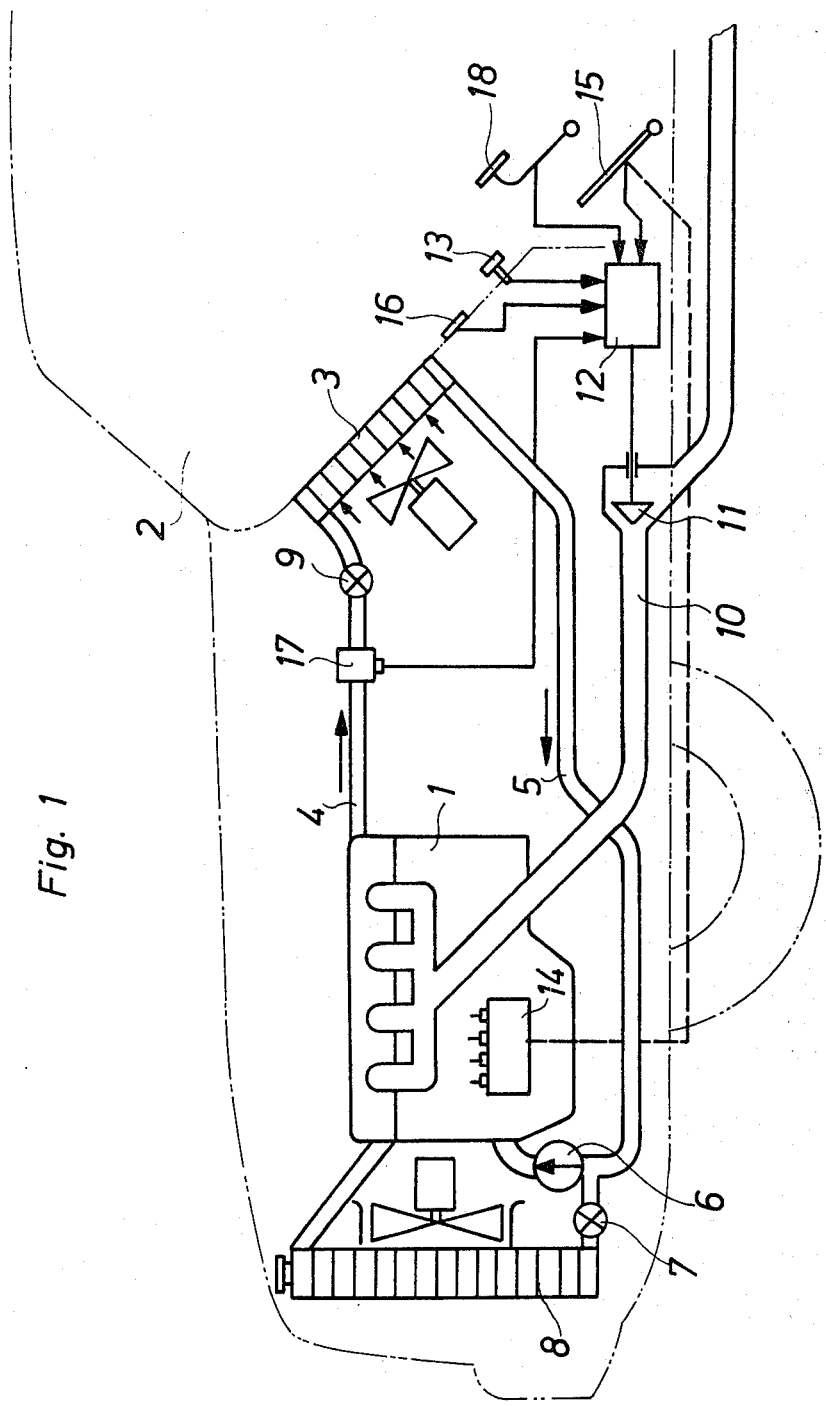
FIG. 1 shows diagrammatically the front part of a motor vehicle.

FIG. 1 diagrammatically illustrates the front part of a motor vehicle which is driven by a water-cooled diesel engine 1. The vehicle is equipped with a heating device for the passenger compartment 2. The heating device has an air-water heat exchanger 3 which is connected by an inflow pipe 4 and a return pipe 5 to the cooling water circuit of the engine 1. Water is circulated through the cooling chambers of the engine and through the heat exchange 3 by a pump 6. A radiator 8 can be connected, by means of a thermostatic valve 7, to the cooling water circuit in the usual way. Heating of compartment 2 can be switched on or off by a manually operated valve 9.

In order to have adequate heating power available when the outside temperature is low and when the engine 1 is delivering only low power, that is to say, during idling and in the lower part of the load range, a throttle element 11 is provided in the exhaust pipe of the engine 1. Operation of the throttle element 11 is controlled by means of control device 12 shown diagrammatically, via which the throttle element 11 can be shifted in a sense to restrict or throttle the exhaust by a manually operable control button 13. The throttling of the exhaust causes the regulator of the injection pump 14 to supply an increased quantity of fuel to the engine, in order to maintain the idling speed or the speed set by the accelerator pedal 15. The combustion of the extra fuel causes a greater quantity of heat to be absorbed by the cooling water, than would be the case if the exhaust was not throttled. In order to return the fuel consumption back to its normal value as soon as possible, a passenger compartment thermostat 16 or cooling water thermostat 17 is provided, which overrides operation of the throttle element 11 by the control button 13 by returning the throttle element to its open position. Alternatively, the opening and closing movement of the throttle element 11 may be controlled by only one of thermostats 16 and 17. At higher loads, the throttle element 11 must be moved into its open position independently of the control button 13 or the thermostats 16 and 17. To this end, the accelerator pedal 15 acts to open the throttle element 11 either directly or via the regulating member of the fuel injection pump 14.

The throttle element 11 also provides the possibility of producing a simple engine brake. This is achieved by connecting a brake actuator 18 via the control device 12 to the throttle element 11 in such a way that it can actuate the latter to restrict or throttle the exhaust 10.

Figure 2:
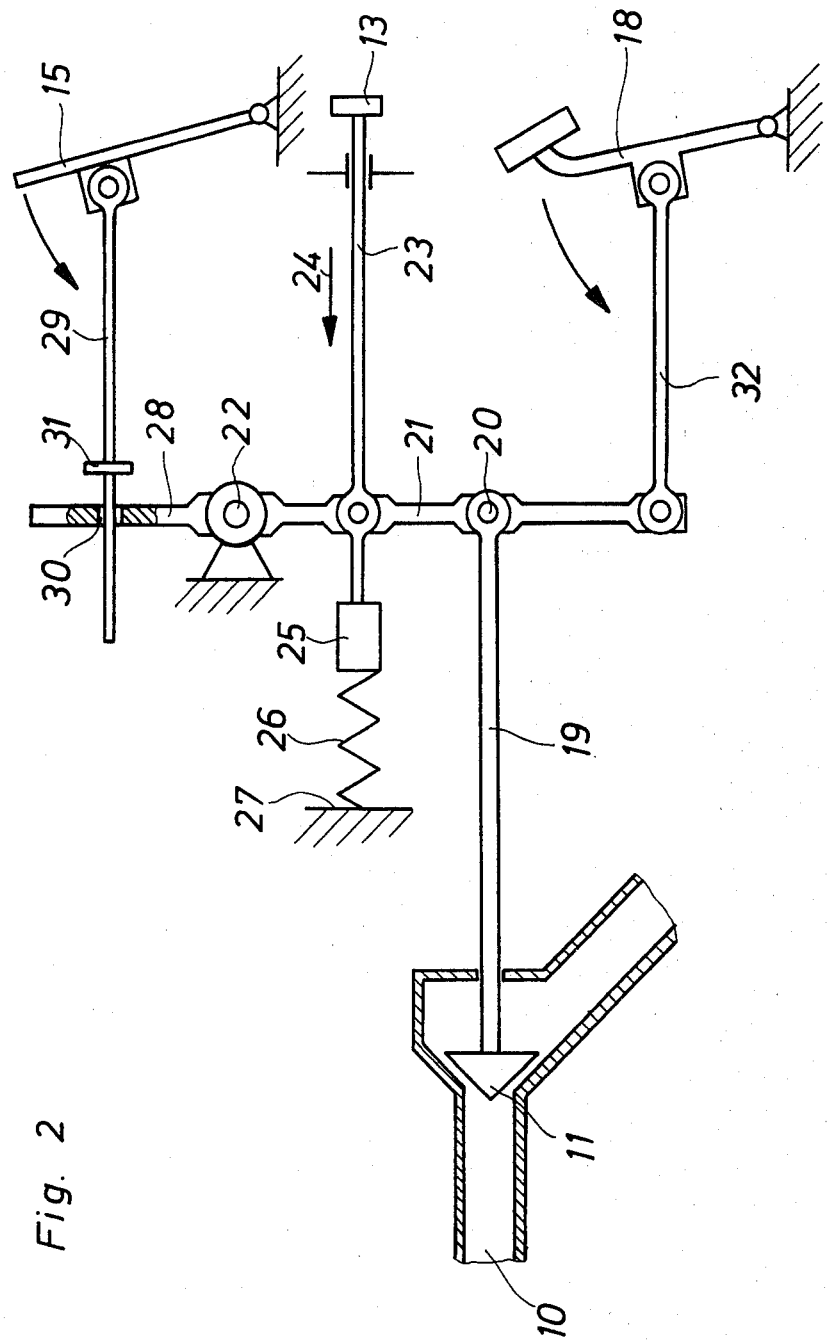
FIG. 2 shows a diagrammatically actuating mechanism for an exhaust throttle element of the motor vehicle of FIG. 1.

The control device 12, via which the throttle element 11 can be actuated in the opening or closing direction from the various operating points, may be mechanical, hydraulic, pneumatic or electrical. FIG. 2, shows, diagrammatically, a mechanical actuating device in which the throttle element 11 is linked, via a rod 19, at 20 to a lever 21, which can pivot about a fixed center of rotation 22. A rod 23 connects control button 13 to the lever 21 between point 20 and the center of rotation 22. A movement of the rod 23 in the direction of the arrow 24 produces a throttling movement of the throttle element 11. An element 25 of expandable material such as a wax thermostat also acts on lever 21. Element 25 is supported by a spring 26 against an abutment 27 and is actuated, for example, by the temperature of the cooling water. With a rising cooling water temperature, the element 25 expands longitudinally causing the lever 21 to pivot anti-clockwise hence moving the throttle element 11 into its open position. The lever 21 has an extension lying above center of rotation 22. A rod 29, which is connected to the accelerator pedal 15 of FIG. 1, acts on extension 28. The rod 29 extends through an orifice 30 in the extension 28 and is provided with a stop 31, which, at a predetermined position of the accelerator pedal 15 corresponding to a predetermined engine load engages the lever extension 28 turning the lever 21 anti-clockwise about its pivot to bring the throttle element 11 into its open position. A rod mechanism 32 is connected to the lever 21 at that end which is the lowermost in FIG. 2, which mechanism is connected to the brake actuator 18 of FIG. 1. By operating the brake actuator 18, the throttle element 11 is moved in a sense to restrict or throttle the exhaust. This movement is not impeded by any of the other elements acting on the lever 21, as during braking the accelerator pedal 15 is not operated and the expanding material element 25 can yield because it is supported by compressible spring 26.

In the exhaust throttling for increasing the heating power is intended to occur automatically, the control button 13 with the mechanism 23 is omitted and the expanding material element is so designed that the throttle element 11 is in its throttling position below a given outside temperature, and with increased heating is brought into its open position by expansion of element 25.

What is claimed is:

1. Apparatus for heating the passenger compartment of a motor vehicle having a water cooled engine, including a cooling water circuit, and an exhaust, the device comprising:
a heat exchanger disposed in the cooling water circuit;
means for circulating air through the heat exchanger into the passenger compartment;
throttle means disposed in the engine exhaust;
means for actuating the throttle in a sense to restrict the exhaust, thereby loading the engine thus causing a rise in the engine's temperature and a corresponding rise in the cooling water temperatures; and
means for actuating the throttle means in an opening direction in accordance with the engine load.

2. Heating apparatus as claimed in claim 1, wherein the first mentioned actuating means is manually operable.

3. Heating apparatus as claimed in claim 1 or claim 2, wherein the first mentioned actuating means is operable in accordance with outside temperature.

4. Heating apparatus as claimed in claim 1 or claim 2, wherein the first mentioned actuating means is operable in accordance with the compartment temperature.

5. Heating apparatus as claimed in claim 1 or claim 2, wherein the first mentioned actuating means is operable in accordance with cooling water temperature.

6. Heating apparatus as claimed in claim 2, further including means for acting on the throttle means in an opening direction in response to a rise in the passenger compartment temperature or the cooling water temperature.

7. Heating apparatus as claimed in claim 1, further including means for fully opening the throttle element whenever the engine load reaches a predetermined level whatever the state of the first mentioned actuating means.

8. Heating apparatus as claimed in claim 7, wherein the means for fully opening the throttle includes an adjustment member of a fuel injection pump.

9. Heating apparatus as claimed in claim 1, further including means for actuating the throttle means in a restricting sense by means of a vehicle brake actuator whatever the state of any other throttle actuating or opening means.

10. A motor vehicle having a water cooled engine including a cooling water circuit and an exhaust, including apparatus as claimed in claim 1.

11. Apparatus for heating the passenger compartment of a motor vehicle having a water cooled engine, including a cooling water circuit, and an exhaust, wherein the engine has a predetermined speed which is automatically maintained, the device comprising:
throttle means disposed in the exhaust;
a first means for actuating the throttle in a manner to restrict the exhaust thereby loading the engine thus causing a rise in the cooling water temperature;
a heat exchanger disposed in the cooling water circuit;
means for circulating air through the heat exchanger into the engine compartment; and
a second means for fully opening the throttle whenever the engine load reaches a predetermined level independent of the first means.

* * * * *

UNITED STATES PATENT AND TRADEMARK OFFICE
CERTIFICATE OF CORRECTION

PATENT NO. : 4,335,849
DATED : June 22, 1982
INVENTOR(S) : Richard van Basshuysen It is certified that error appears in the above—identified patent and that said Letters Patent is hereby corrected as shown below:

On The Title Page,
Change the inventor's name from "van Bashuysen" to

--van Basshuysen--;

In the Assignee's name "Nsu" should be --NSU--;

Column 1, line 19, before "are" insert --which--;

Column 1, line 63, change "water" to --wear--;

Column 3, line 56, change "In" to --If--.

Signed and Sealed this

Thirty-first Day of August 1982

[SEAL]

Attest:

GERALD J. MOSSINGHOFF

Attesting Officer    Commissioner of Patents and Trademarks